V. A. FYNN.
DYNAMO ELECTRIC MACHINE.
APPLICATION FILED JULY 2, 1917.
1,359,687.
Patented Nov. 23, 1920.
3 SHEETS—SHEET 1.
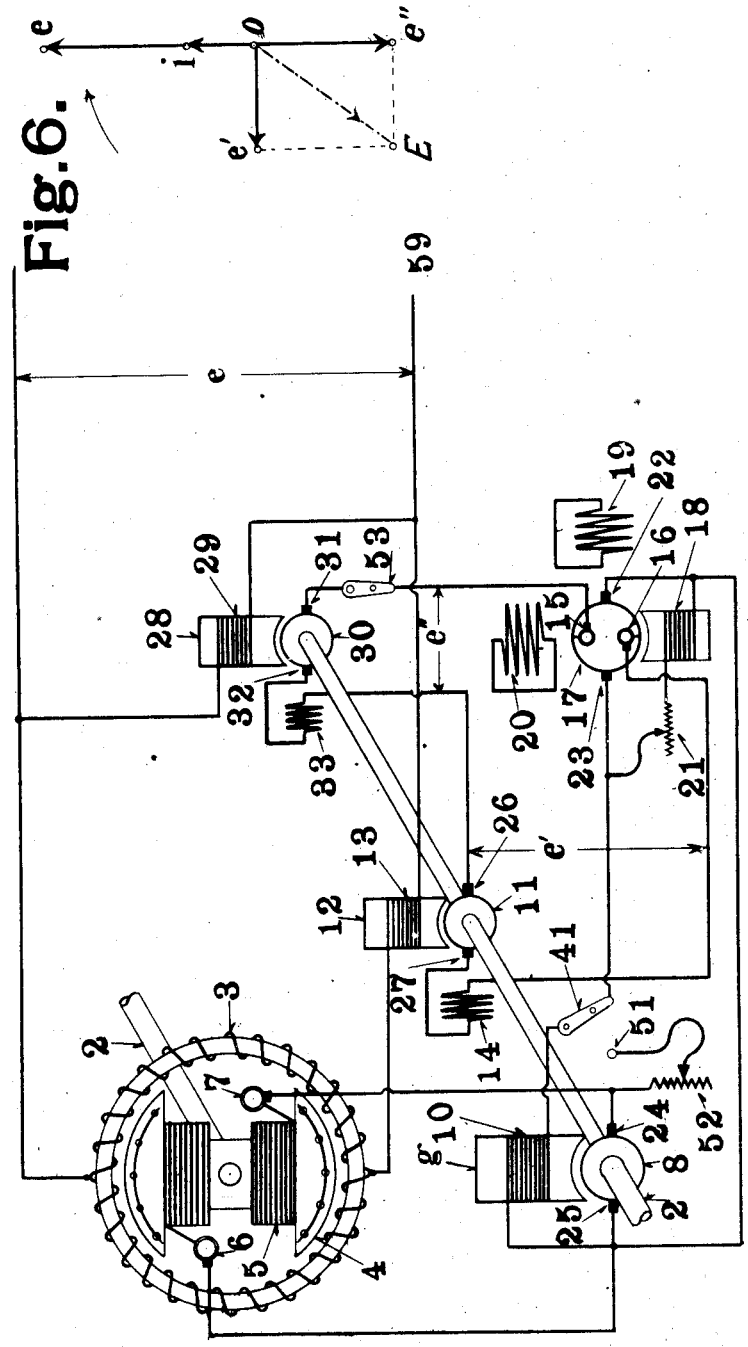
WITNESS
W. A. Alexander
INVENTOR.
Valere A. Fynn
BY E. E. Huffman
ATTORNEY.

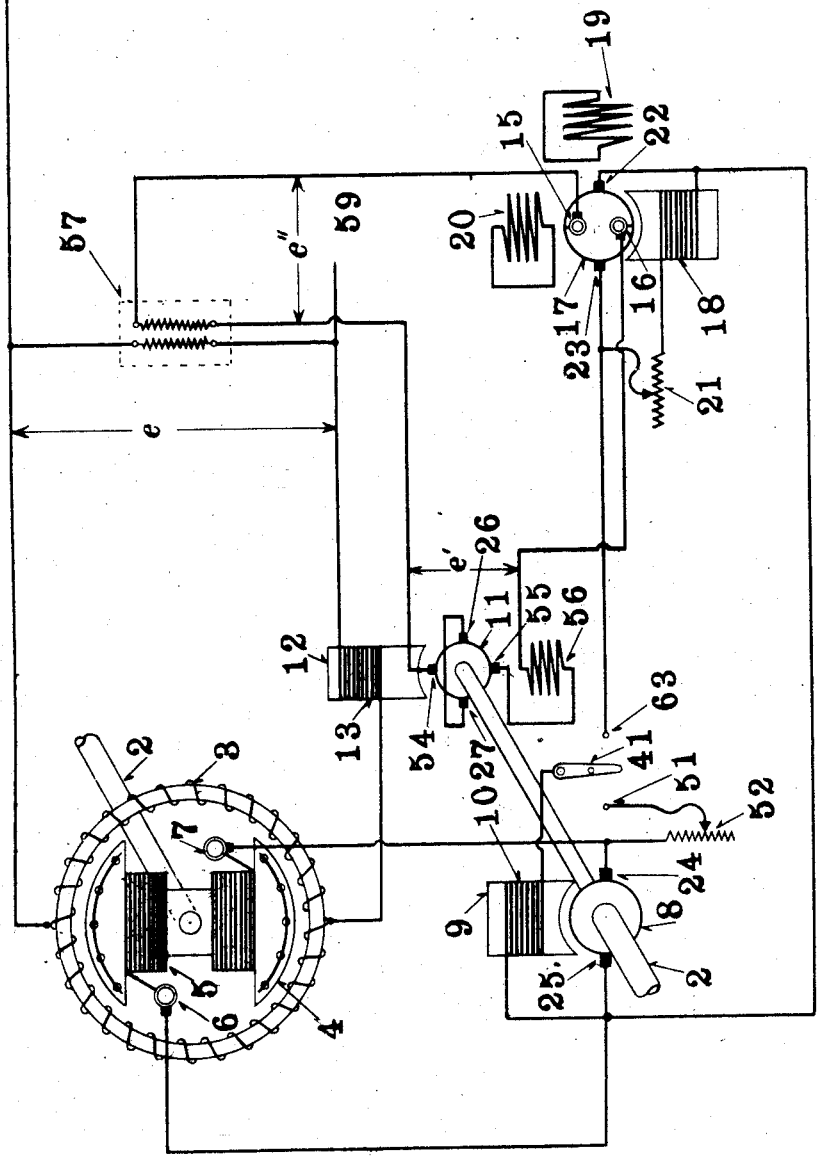

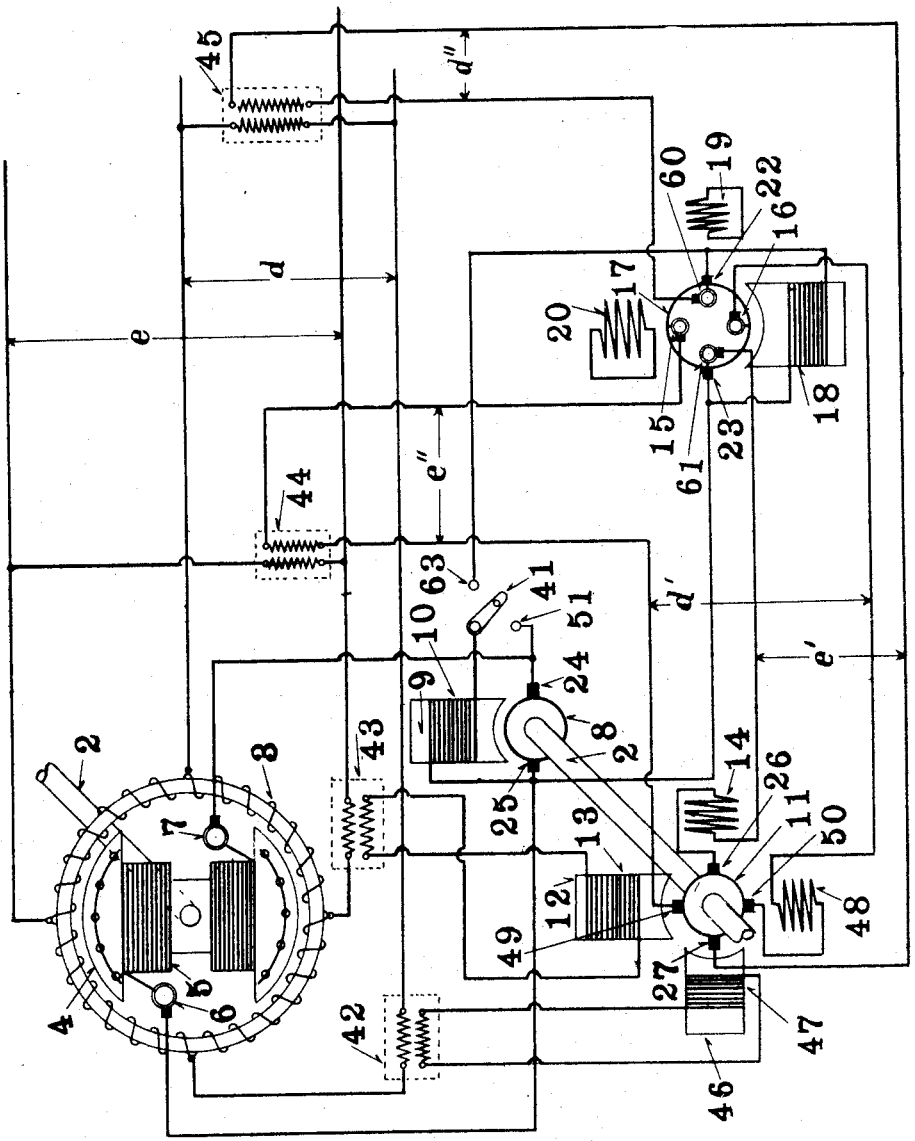

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,359,687.  Specification of Letters Patent.  Patented Nov. 23, 1920.

Application filed July 2, 1917. Serial No. 178,062.

*To all whom it may concern:*

Be it known that I, VALÈRE A. FYNN, a subject of the King of England, residing at the city of St. Louis, State of Missouri, United States of America, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to alternating current motors or generators and has for its object to automatically vary the excitation of such machines in accordance with the magnitude of the load current and the phase relation of said current with respect to the terminal voltage. When applied to generators, this invention serves to control the terminal voltage. When applied to motors, it affects the power factor of the machine.

In carrying out my invention I make a part of the excitation of the motor or generator dependent on the phase or magnitude of the load current. To this end I provide means for generating an E. M. F. the phase of which always bears the same relation to the phase of the load current independently of any variation between the phase of the load current and that of the terminal voltage. I prefer to cause the magnitude of this E. M. F. to vary proportionately with the magnitude of the load current. In applying my invention to machines having unidirectional excitation I combine this alternating "load current E. M. F." with another alternating E. M. F. differing in phase from the former, and I impress the resultant E. M. F. on the alternate current side of a rotary converter the direct current end of which provides the excitation of the synchronous motor or generator either directly or through the interposition of a direct current exciter the excitation for which is provided by the converter.

My invention will be better understood by reference to the accompanying drawings, in which Figure 1 shows the invention as applied to a single-phase alternator. Fig. 5 indicates a modification of Fig. 1. Fig. 7 shows the invention as applied to a two-phase alternator, and Figs. 2, 3, 4 and 6 are explanatory diagrams.

Referring to Fig. 1, the single-phase two-pole synchronous generator to which the invention is applied has an armature winding 3 located on the starter and a field structure 4 carried by the shaft 2. This field structure is provided with an exciting winding 5 connected to the slip rings 6, 7 and usually insulatingly carried by the shaft 2. Mounted on this same shaft is the armature 8 of the direct current exciter coöperating with the stationary field structure 9 provided with the exciting winding 10. The brushes 24, 25 coöperating with the armature 8 are connected to the slip rings 6, 7 by way of stationary brushes. The shaft 2 also carries the armatures 11 and 30, each provided with a commuted winding and coöperating brushes 26, 27 and 31, 32. The field structure 12 coöperating with the armature 11 is provided with the exciting winding 13 included in one of the mains. The field structure 28 coöperating with the armature 30 is provided with an exciting winding 29 connected across the terminals of the generator winding 3. The generator 11, 12 is provided with a neutralizing winding 14 adapted to oppose the armature ampere turns. The generator 30, 28 is provided with a similar winding 33. The armature circuits of these two generators are connected in series and to the slip rings 15, 16 of a rotary converter provided on its rotor with a commuted winding 17 with which coöperate the stationary brushes 22, 22 and to which the slip rings 15, 16 are connected. The stator of this converter carries a unidirectional exciting winding 18 connected to the brushes 22, 23 by way of the adjustable resistance 21, and the two short circuited damping windings 19, 20. The direct current brushes 22, 23 are connected to the exciting winding 10 of the direct-current exciter 8, 9. One pole of this exciting winding 10 is also connected to the brush 25 of the exciter while the two-way switch 41 is interposed between the other pole of the winding 10 and the brush 23 of the converter. When the switch 41 occupies the position shown in Fig. 1, then the winding 10 is connected to the brushes 22, 23 of the converter. When switch 41 is moved to the contact 51, then the winding 10 is connected to the brushes 24, 25.

The operation of the machine as a synchronous generator is somewhat as follows: Assuming the machine to be running on open circuit, with a voltage $e$ at its terminals, then all of the unidirectional excitation produced by the winding 5 will be due to the E. M. F. $e''$ generated in the armature 30 by rotation through the alternating field due to the exciting winding 29. The armature 11 generates no E. M. F. because there is no current through the exciting winding 13, and $e'$ is therefore zero. The E. M. F. $e''$ is impressed on slip rings 15, 16 of the converter, a direct current E. M. F. proportional to $e''$ in magnitude appears at the commutator brushes 22, 23, and is impressed on the exciting winding 10 of the direct current exciter and produces at the commutator brushes 24, 25 thereof a direct current E. M. F. proportional to $e''$ and therefore a unidirectional excitation of the synchronous generator which is also proportional to $e''$. The phase of $e''$ is the same as that of the magnetization produced by 29 and lags by practically 90 degrees behind the phase of $e$, because the E. M. F. $e$ is impressed on the inductive winding 29 and produces therein a current and a magnetization lagging by about 90 degrees behind $e$. The E. M. F. generated in 30 and appearing at the brushes 31, 32, is always in phase with the magnetization produced by 29 and therefore in phase quadrature with $e$. Its magnitude depends on the magnitude of the magnetization produced by 29 and on the speed at which the armature 30 revolves. Its periodicity is independent of the speed of rotation and is the same as the periodicity of the exciting flux due to 29. Supposing, now, that the alternator is caused to deliver a current in phase with its terminal voltage, this load current $i$, circulating through the exciting winding 13, will produce a magnetization practically in phase with it, and therefore with $e$, with the result that an alternating E. M. F. $e'$ will appear at the brushes 26, 27, the phase and periodicity of which will be the same as that of the load current $i$, and the magnitude of which will depend on the speed of rotation of the armature 11 and on the magnitude of the excitation produced by 13. For a unity power factor load, $e'$ will be in phase with $e$ because $i$ is then in phase with $e$, and will combine with $e''$ as shown in Fig. 2, the resultant E being larger than $e''$ and displaced in phase therefrom. The phase of the resultant will have no influence on the excitation of the synchronous generator, but its magnitude will. This increase in the excitation of the synchronous generator, for an increase of a unity power factor load, will tend to compound the generator. Should the nature of the load change and cause the generator current to lag behind its terminal voltage, then $e'$ will lag by a corresponding angle behind $e$, as shown in Fig. 3, and will more nearly approach the phase of $e''$.

The resultant E of $e'$ and $e''$ will, under those circumstances, be very much greater than in the case of unity power factor, even though the magnitude of $i$ has remained unchanged, thus making up for the demagnetizing effect of a lagging load current. This is clearly shown in Fig. 3. Should the load current lead the terminal E. M. F. of the synchronous generator, then $e'$ will lead $e$ and the resultant E impressed on the alternate current side of the rotary converter will be very much smaller, as clearly appears from Fig. 4, thus reducing the unidirectional magnetization of the synchronous generator in proportion to the magnetizing effect of a leading load current.

A convenient way of initiating the operation of such an alternator is to open switch 53 and then move switch 41 to point 51, thus making the exciter 8, 9 self exciting and bringing the terminal voltage of the synchronous alternator to the desired value, for instance by means of the adjustable resistance 52. It is next necessary to bring the converter up to speed in some known manner and to close switch 53. When the voltage at the converter brushes 22, 23 is about the same as that impressed on the winding 10 of the exciter and is of the proper direction, then switch 41 can be moved into the position shown in Fig. 1, thus completing all the normal operating connections.

The successful operation of the arrangement shown in Fig. 1 depends on the constancy of the phase relation between the "load current E. M. F." $e'$ and the load current $i$, and also on the availability of a second alternating E. M. F. displaced in phase from the "load current E. M. F." preferably by 90 degrees when the load current is in phase with the terminal voltage of the alternator. In order to carry out this invention successfully, it is not necessary that the "load current E. M. F." be of same phase as $i$; it may have any desired phase relation with respect to $i$, so long as this relation remains constant throughout any phase variations of $i$. The phase of the E. M. F. $e''$ should in all cases be preferably so chosen as to be in phase quadrature with the "load current E. M. F." at the time when the load current is in phase with the terminal E. M. F.

The modification shown in Fig. 5, illustrates how it is possible to obtain a load current E. M. F. always in phase quadrature with the load current and combine same for the purposes of this invention with an E. M. F. of same phase as the terminal voltage.

In Fig. 5 the auxiliary dynamo 30, 28 of Fig. 1 is dispensed with and replaced by the shunt transformer 57 connected across the mains 58, 59. The dynamo 11, 12 has an exciting winding 13 connected in circuit with the main 59, short circuited brushes 26, 27 displaced by 90 electrical degrees from the axis of the exciting winding 13, and other brushes 54, 55 coaxial with the exciting winding 13 and with the neutralizing winding 56 with which they are connected in series. The "load current E. M. F." $e'$ is generated at these brushes 54, 55 and is connected in series with the auxiliary E. M. F. $e''$ derived from the secondary of the shunt transformer 57. In other respects the arrangement shown in Fig. 5 is identical with that of Fig. 1.

Fig. 6 shows the phase relations of the load current and the various E. M. F.'s in Fig. 5 for the case of phase coincidence between the load current $i$ and the terminal E. M. F. $e$ of the synchronous generator or motor, 3, 4. The magnetization produced by the winding 13 in the generator 11, 12, is in phase with $i$, and in this case also in phase with the terminal voltage $e$. The voltage generated at the brushes 26, 27 by rotation of the armature 11, is in phase with $i$. The current due to that voltage and circulating through the armature 11 along the axis 26, 27, lags by about 90 degrees behind $i$ and produces a magnetization of practically the same phase along the axis 26, 27. By rotation of the armature 11 in this last magnetization, there is generated an E. M. F. $e'$ in phase with this magnetization and therefore lagging by about 90 degrees behind $i$. The E. M. F.'s $e'$ and $e''$ of Fig. 5 have therefore under all circumstances exactly the same phase relation to each other as the corresponding E. M. F.'s of Fig. 1. But in Fig. 5 $e'$ is always in phase quadrature with the load current $i$, instead of always being in phase with it as in Fig. 1.

Fig. 7 shows a two-phase alternator the unidirectional excitation of which is made dependent on two E. M. F.'s. Each of these E. M. F.'s is the vectorial sum of two alternating E. M. F.'s, one of which is in phase with the terminal voltage of one phase while the other is in phase with the load current in the other phase. The resultants are impressed on the alternating current side of a rotary converter the direct current side of which controls the excitation of the direct current exciter supplying the synchronous alternator or motor. The stationary armature of the two pole synchronous machine carries a winding 3 tapped at four equidistant points and generating the equal but phase displaced E. M. F.'s $d$ and $e$. The field structure 4 is carried by the shaft 2 and is provided with a uni-directional exciting winding 5 connected to the slip rings 6 and 7 usually insulatingly supported by the shaft 2. This same shaft carries the armature 8 of the direct current exciter, the brushes 24, 25 of which are connected to the slip rings 6, 7, by way of stationary brushes. The field structure 9 of this exciter carries the winding 10, one end of which is permanently connected to the brush 25 coöperating with the armature 8 and to the direct current brush 23 of the converter. The other end of the winding can be connected either to the brush 24 of the exciter, or the brush 22 of the converter by means of the two-way switch 41.

The "load current E. M. F.'s" are generated in the armature 11 carried by the shaft 2. This armature is provided with a commuted winding with which coöperate two sets of brushes displaced by 90 electrical degrees. The field structure of this generator carries an exciting winding 13 connected to the secondary of the series transformer 43 the primary of which is included in the phase $e$ of the synchronous generator. It also carries an exciting winding 47 connected to the secondary of the series transformer 42 the primary of which is included in the phase $d$ of the synchronous generator. The brushes 26, 27 are displaced by 90 electrical degrees from the exciting winding 13 and connected in series with the neutralizing winding 14, said winding being adapted to neutralize the armature reaction along the axis 26, 27. The E. M. F. $e'$, appearing at the terminals of this circuit, is always in phase with the load current of the phase $e$. The brushes 49, 50 are displaced by 90 electrical degrees with respect to the axis of the exciting winding 47 and are connected in series with the neutralizing winding 48 adapted to annul the armature reaction along the axis 49, 50. The E. M. F. $d'$, appearing at the terminals of this circuit, is always in phase with the load current of phase $d$ of the synchronous generator. The shunt transformer 44 is connected across phase $e$, and the E. M. F. $e''$ appearing at the terminals of its secondary winding is in phase with the terminal E. M. F. of phase $e$. The shunt transformer 45 is connected across the terminals of phase $d$. The E. M. F. $d''$ at the terminals of its secondary is in phase with the terminal E. M. F. of phase $d$. The rotor of the two-pole converter carries a commuted winding 17 connected at four equidistant points to the slip rings 15, 60, 16, 61. Brushes 22, 23 coöperate with this commuted winding and are connected to the stator winding 18, the axis of which is displaced by 90 electrical degrees from the brush axis, 22, 23. The stator also carries two displaced damping windings 19, 20. The slip ring 16 is connected by means of a stationary brush to the neutralizing winding 48, the brush 50, the commuted winding 11, the brush 49, the secondary of the shunt transformer 44, and the slip ring 15 through the brush coöperating therewith.

The slip ring 61 is connected to the neutralizing winding 14, the brush 26, the commuted winding 11, the brush 27, the secondary of the shunt transformer 45, and the slip ring 60. In this way the vectorial sum of the E. M. F.'s $e'$ and $d''$ is impressed on the axis 60, 61 of the rotary converter while the vectorial sum of the E. M. F.'s $d'$ and $e''$ is impressed on the axis 15, 16 of this converter, which is displaced by 90 electrical degrees from the first.

The operation of this alternator is the same as that of the machine shown in Fig. 1. In order to initiate the excitation of the synchronous generator, it is preferred to move switch 41 to point 51. As soon as an appreciable E. M. F. appears at the terminals of the generator winding 3, the polyphase converter will start and reach synchronism. When a sufficient excitation has been produced, switch 41 can be moved to 63, thus connecting the winding 10 to the brushes 22, 23 of the converter. The E. M. F.'s $e''$ and $d''$ will always coincide in phase with the terminal E. M. F.'s of the generator. The E. M. F.'s $e'$ and $d'$ will always be in phase with the load currents in the two phases. In order to see how the unidirectional excitation of the synchronous machine shown in Fig. 7 varies with the varying load and varying power factor of said load, it is only necessary to observe the variation of the magnitude of the vectorial sum of $d'$ and $e''$ and of $e'$ and $d''$. Considering $d'$ and $e''$, it is seen that in Figs. 2, 3 and 4, $d'$ takes the place of $e'$. Considering $e'$ and $d''$, it is seen that in Figs. 2, 3 and 4, $d''$ takes the place of $e''$.

Referring more particularly to Fig. 1, it is apparent from Figs. 2, 3 and 4 that the magnitude of $e''$ must be selected to provide the necessary no-load excitation. If the magnitude of $e'$ is so chosen as to produce the desired terminal voltage with a unity power factor load, then it may happen that the directly magnetizing or demagnetizing effect of the armature reaction for leading or lagging power factor will not be properly taken care of as to magnitude by an E. M. F. $e'$ of same value. To at least partly overcome this difficulty it is desirable to compound the converter in some known way, for instance by means of impedance in the slip ring circuit. A simple way to achieve this end is to under-neutralize the dynamos 11, 12 or 28, 30.

Having fully described my invention, what I claim as new and desire to secure by Letters Patent of the United States is:

1. In combination, an alternating current dynamo electric machine having an exciting winding, means for producing an alternating current E. M. F. having a constant phase relation to the load current of the dynamo electric machine, means for producing a second alternating current E. M. F. having a constant phase relation to the terminal voltage of the dynamo electric machine, and means for utilizing the resultant of said E. M. F.'s to vary the excitation of the dynamo electric machine.

2. In combination, an alternating current dynamo electric machine having an exciting winding, means for producing an alternating current E. M. F. having a constant phase relation to the load current of the dynamo electric machine, means for producing a second alternating current E. M. F. having a constant phase relation to the terminal voltage of the dynamo electric machine, and means for varying the excitation of the dynamo electric machine in response to variations in the magnitude of the resultant of said E. M. F.'s.

3. In combination, an alternating current dynamo electric machine having an exciting winding, an auxiliary alternating current generator for producing an alternating current E. M. F. having a constant phase relation to the load current of the dynamo electric machine, means for producing a second E. M. F. having a constant phase relation to the terminal voltage of the dynamo electric machine, and means for utilizing the resultant of said E. M. F.'s to vary the excitation of the dynamo electric machine.

4. In combination, an alternating current dynamo electric machine having an exciting winding, means for producing an alternating current E. M. F. constantly in phase quadrature to the load current of the dynamo electric machine, and means for utilizing said E. M. F. to vary the excitation of the dynamo electric machine.

5. In combination, an alternating current dynamo electric machine having an exciting winding, means for deriving two alternating current E. M. F.'s, one of which has a constant phase relation to the load current of the dynamo electric machine, said E. M. F. also being in phase quadrature with the other E. M. F. when the load current is in phase with the terminal E. M. F. of the dynamo electric machine, and means for utilizing the resultant of said E. M. F.'s to vary the excitation of the dynamo electric machine.

6. In combination, an alternating current dynamo electric machine having an exciting winding, means for deriving two alternating current E. M. F.'s one of which has a constant phase relation to the load current of the dynamo electric machine, the phases of said E. M. F.'s when the load current is in phase with the terminal E. M. F. being such that one of them is in phase with the terminal E. M. F. and the other in quadrature thereto, and means for utilizing the resultant of said E. M. F.'s to vary the excitation of the dynamo electric machine.

7. In combination, an alternating current dynamo electric machine having an exciting winding, means for producing an alternating current E. M. F. constantly in phase quadrature with the load current of the dynamo electric machine, means for producing a second alternating current E. M. F. of the same phase as the terminal voltage of the dynamo electric machine, and means for utilizing the resultant of said E. M. F.'s to vary the excitation of the dynamo electric machine.

8. In combination, an alternating current dynamo electric machine having an exciting winding, a direct current exciting dynamo in circuit with said exciting winding, an auxiliary alternating current generator having its field winding in series relation with the dynamo electric machine, a rotary converter having its alternating current side connected in circuit with the auxiliary generator, and its direct current side connected to the direct current dynamo.

9. In combination, an alternating current dynamo electric machine having an exciting winding, means for deriving two alternating current E. M. F.'s, one of which is always in phase quadrature with the load current of the dynamo electric machine, said E. M. F. also being in phase quadrature with the other E. M. F. when the load current is in phase with the terminal E. M. F. of the dynamo electric machine, and means for utilizing the resultant of said E. M. F.'s to vary the excitation of the dynamo electric machine.

10. In combination, an alternating current dynamo electric machine having an exciting winding, a direct current exciting dynamo in circuit with said exciting winding, an auxiliary alternating current generator having its field winding in series relation with the dynamo electric machine, a rotary converter connected in circuit with the auxiliary generator, means for applying to said last named circuit a second E. M. F. whose phase is in quadrature with the E. M. F. produced by the auxiliary alternating current generator, when the load current of the dynamo electric machine is in phase with the terminal E. M. F. thereof, and means connecting the direct current side of the rotary converter to the direct current dynamo.

11. In combination, an alternating current dynamo electric machine having an exciting winding, a direct current exciting dynamo in circuit with said exciting winding, a rotary converter, an auxiliary alternating current generator having its field winding in series relation with the dynamo electric machine and having its armature provided with two sets of brushes displaced by 90 electrical degrees from each other, one of said sets of brushes being in the axis of the field winding and in circuit with the rotary converter and the other set of brushes being short-circuited, and means connecting the direct current side of the rotary converter to the direct current dynamo.

12. In combination, an alternating current dynamo electric machine having an exciting winding, a direct current exciting dynamo in circuit with said exciting winding, a rotary converter, an auxiliary alternating current generator having its field winding in series relation with the dynamo electric machine and having its armature provided with two sets of brushes displaced by 90 electrical degrees from each other, one of said sets of brushes being in the axis of the field winding and in circuit with the rotary converter and the other set of brushes being short-circuited, means for applying to the circuit including the rotary converter and the auxiliary alternating current generator a second alternating current E. M. F., said second E. M. F. being in phase quadrature with the E. M. F. produced by the auxiliary generator when the load current of the dynamo electric machine is in phase with the terminal E. M. F. thereof, and means connecting the direct current side of the rotary converter to the direct current dynamo.

In testimony whereof I have hereunto set my hand and affixed my seal.

VALÈRE A. FYNN. [L. S.]